US009773655B2

United States Patent
Konishi

(10) Patent No.: US 9,773,655 B2
(45) Date of Patent: Sep. 26, 2017

(54) RADIO-FREQUENCY VOLTAGE GENERATOR

(71) Applicant: SHIMADZU CORPORATION, Kyoto-shi, Kyoto (JP)

(72) Inventor: Ikuo Konishi, Nara (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/312,325

(22) PCT Filed: May 21, 2014

(86) PCT No.: PCT/JP2014/063475
§ 371 (c)(1),
(2) Date: Nov. 18, 2016

(87) PCT Pub. No.: WO2015/177886
PCT Pub. Date: Nov. 26, 2015

(65) Prior Publication Data
US 2017/0084441 A1  Mar. 23, 2017

(51) Int. Cl.
*H02M 7/00* (2006.01)
*H02M 7/42* (2006.01)
(Continued)

(52) U.S. Cl.
CPC .......... *H01J 49/062* (2013.01); *H01J 49/422* (2013.01); *H02M 7/44* (2013.01); *H02M 7/538* (2013.01); *H02M 2007/4815* (2013.01)

(58) Field of Classification Search
USPC ....... 330/51, 296, 297, 207 R, 302; 332/109, 332/110, 112, 113; 307/112, 113, 125,
(Continued)

(56) References Cited

U.S. PATENT DOCUMENTS 4,853,821 A * 8/1989 Lewis .................... H02H 11/00
307/130
6,008,549 A * 12/1999 Cooper ................. H02M 1/088
307/125
(Continued)

FOREIGN PATENT DOCUMENTS

JP 2011-175982 A 9/2011
WO 2012/150351 A1 11/2012

OTHER PUBLICATIONS

International Search Report for PCT/JP2014/063475 dated Jul. 29, 2014 [PCT/ISA/210].
(Continued)

*Primary Examiner* — Bernard Souw
(74) *Attorney, Agent, or Firm* — Sughrue Mion, PLLC

(57) ABSTRACT

A radio-frequency voltage generator includes a first DC power supply for generating first direct-current voltage; a second DC power supply for generating second direct-current voltage; a transient alternating voltage generation circuit for generating a transient alternating voltage having a cycle shorter than a cycle of the radio-frequency voltage and having a voltage value oscillating between the first direct-current voltage and the second direct-current voltage; and a voltage switch section for switching voltages from the first direct-current voltage, to the transient alternating voltage, to the second direct-current voltage, and to the transient alternating voltage in this order, wherein the voltage switch section switches the voltages applied to the load so that the transient alternating voltage oscillates a half-integer of times starting with an initial value having the value of the direct-current voltage applied immediately before the switching, the half-integer being equal to or greater than 1.5.

12 Claims, 7 Drawing Sheets

(51) Int. Cl.
*H02M 7/44* (2006.01)
*H01J 49/06* (2006.01)
*H01J 49/42* (2006.01)
*H02M 7/538* (2007.01)
*H02M 7/48* (2007.01)

(58) Field of Classification Search
USPC ........ 307/126, 130, 131, 132 R, 132 M, 149
See application file for complete search history.

(56) References Cited

U.S. PATENT DOCUMENTS

| | | | | |
|---|---|---|---|---|
| 6,198,441 B1* | 3/2001 | Okabe | ................ | H01Q 1/243 343/702 |
| 6,466,774 B1* | 10/2002 | Okabe | ................ | H01Q 1/243 455/150.1 |
| 7,557,670 B1* | 7/2009 | Tai | ................ | H03K 7/08 332/109 |
| 8,044,349 B2* | 10/2011 | Satake | ................ | H01J 49/004 250/290 |
| 8,232,680 B2* | 7/2012 | DiMarco | ................ | H02J 9/062 307/125 |
| 8,289,084 B2* | 10/2012 | Morimoto | ................ | H03F 1/0216 330/296 |
| 8,451,054 B2* | 5/2013 | Kunihiro | ................ | H03F 1/0222 330/136 |
| 8,680,719 B2* | 3/2014 | Yang | ................ | G06F 1/26 307/130 |
| 2010/0065740 A1* | 3/2010 | Iwamoto | ................ | H01J 49/164 250/288 |
| 2013/0313427 A1* | 11/2013 | Mizutani | ................ | H01J 49/022 250/290 |
| 2014/0061457 A1* | 3/2014 | Berdnikov | ................ | H01J 49/0095 250/281 |

OTHER PUBLICATIONS

Written Opinion for PCT/JP2014/063475 dated Jul. 29, 2014. [PCT/ISA/237].

* cited by examiner (a) $V = V_t(\omega)$ (b) $V \rightarrow -V_0$ (c) V IS KEPT AT $V = +V_0$ (d) $V = V_t(\omega)$ (e) $V \rightarrow +V_0$ (f) V IS KEPT AT $V = +V_0$

V=+V₀

V→0

V=-V₀

V=→0

RADIO-FREQUENCY VOLTAGE GENERATOR

CROSS REFERENCE TO RELATED APPLICATIONS

This application is a National Stage of International Application No. PCT/JP2014/063475, filed on May 21, 2014, the contents of all of which are incorporated herein by reference in their entirety.

TECHNICAL FIELD

The present invention relates to a radio-frequency voltage generator that generates radio-frequency voltage from direct-current voltage and applies the radio-frequency voltage to a load. The radio-frequency voltage generator is suitably used in a charged particle controller such as an ion guide and an ion trap to control focusing, transportation, and filtering on ions in a mass spectrometer.

BACKGROUND ART

A charged particle controller used in a mass spectrometer uses a radiofrequency field that is spatially and temporally modulated to control the movement of ions (see Patent Literature 1).

For example, in an ion guide that includes n rod electrodes (n is an even number) arranged so as to surround an ion beam axis, a radio-frequency voltage $V_{RF}$ having an amplitude of V and a frequency of $\Omega$ is applied so that adjacent rod electrodes have reversed polarity, whereby a pseudopotential $V_p(R)$ due to the radiofrequency field is formed in the ion guide. Here, R denotes a distance from the ion beam axis in a radial direction. The pseudopotential $V_p(R)$ is expressed as follows:

$$V_p(R) = \{qn^2/(4\ m\Omega^2)\} \cdot (V/r)^2 \cdot (R/r)^{2(n-1)}$$

where r denotes the inradius of the ion guide, m denotes the mass of an ion, and q denotes the (electric) charge of the ion. From this expression, the followings can be explained.

When one or more of the inradius r of the ion guide, the amplitude V of the radio-frequency voltage $V_{RF}$, and the frequency $\Omega$ of the radio-frequency voltage $V_{RF}$ is changed, the pseudopotential $V_p(R)$ changes. Therefore, making the pseudopotential $V_p(R)$ change along the ion beam axis forms a gradient of the pseudopotential $V_p(R)$, and force is generated by the gradient, whereby ions can be transported.

However, in the case where ion guides exist continuously along the ion beam axis, as in the case of using rod electrodes, changing the pseudopotential by an electric method, as changing the amplitude V or the frequency $\Omega$ of the radio-frequency voltage $V_{RF}$, is difficult, and the structure of the ion guides, such as the inradius r of the ion guides needs to be changed. However, the structure of the ion guides cannot be changed in use, and thus it is impossible to control ions at will.

Meanwhile, to change the pseudopotential by the electric method such as changing the amplitude V and the frequency $\Omega$, electrodes arranged separately in the direction of the ion beam axis may be used instead of a simple rod electrode, and radio-frequency voltages $V_{RF}$ having different amplitudes V and frequencies $\Omega$ may be applied to the respective electrodes. However, in order to control the amplitude V, the frequency $\Omega$, and the like on an analog (sine wave) radio frequency, a complicated device has to be used, which is difficult to be implemented for ion guides.

Thus, in order to apply radio-frequency voltages to electrodes of the ion guide, and to perform control of changing the amplitude of the applied radio-frequency voltage along the ion beam axis, a digital radio-frequency voltage generator that generates rectangular waves is used, in which a direct-current voltage is switched on/off at high speed or positive/negative direct-current voltages are alternately switched at high-speed to generate (pseudo-)radio-frequency voltage. A typical digital radio-frequency voltage generator performs a switching operation in which the positive/negative direct-current voltages are alternately repeated (FIG. 9A). Patent Literature 2 describes that the direct-current voltage is set at 0 for a certain time period when the direct-current voltage is switched from positive to negative, and from negative to positive, that is, the direct-current voltage is switched in the order of $0 \rightarrow +V_0 \rightarrow 0 \rightarrow -V_0 \rightarrow 0$ during one cycle of a radio frequency (FIG. 9B). Here, by changing the ratio of a time period $t_v$ to maintain the direct-current voltage at $+V_0$ and $-V_0$, to a time period $t_0$ to maintain the direct-current voltage at zero, it is possible to change the effective amplitude V of the radio-frequency voltage without changing the cycle and the magnitude of the direct-current voltage.

Switching of voltages illustrated in FIG. 9B is implemented by, for example, an electric circuit 90 illustrated in FIG. 10. A capacitor C in the electric circuit 90 corresponds to an electrode pair in an ion guide. One of the terminals of the capacitor C is grounded, and the other terminal is connected in parallel to a first power supply $E_1$ at a potential $+V_0$ via a first switch $S_1$ and a second power supply $E_2$ at a potential $-V_0$ via a second switch $S_2$. To the two terminals of the capacitor C, an electric resistance R and a zeroth switch $S_0$, which are connected in series to each other, are connected in parallel to the capacitor C.

The switching of voltage in the electric circuit 90 is performed as follows. With the zeroth switch $S_0$ connected in parallel to the capacitor C (electrode pair) being opened, the second switch $S_2$ is opened, and the first switch $S_1$ is closed, whereby a voltage $+V_0$ is applied across the capacitor C (electrode pair) (FIG. 11A). Next, the first switch $S_1$ is opened, and the zeroth switch $S_0$ is closed, whereby the voltage across the capacitor C (electrode pair) becomes zero (FIG. 11B). Subsequently, the zeroth switch $S_0$ is opened, and the second switch $S_2$ is closed, whereby the voltage $-V_0$ is applied across the capacitor C (electrode pair) (FIG. 11C). Furthermore, the second switch $S_2$ is opened, and the zeroth switch $S_0$ is closed, whereby the voltage across the capacitor C (electrode pair) becomes zero (FIG. 11D). Through the above operation, the switching of voltages, $0 \rightarrow +V_0 \rightarrow 0 \rightarrow -V_0 \rightarrow 0$, that is one cycle of the radio-frequency voltage is performed. Thus, only by changing the ratio of a time period to close the zeroth switch $S_0$ (a time period to maintain the direct-current voltage at zero) $t_0$ to a time period to close the first switch S1 or the second switch S2 (a time period to maintain the direct-current voltage at $+V_0$ or $-V_0$) $t_v$, the effective amplitude V of the radio-frequency voltage can be controlled. This circuit is simpler than that in the case of using an analog (sine wave) radio frequency and can be easily implemented.

CITATION LIST

Patent Literature

[Patent Literature 1] JP 2011-175982 A
[Patent Literature 2] WO 2012/150351 A

SUMMARY OF INVENTION

Technical Problem
In these conventional digital radio-frequency voltage generators, the waveform is rectangular, and voltage is sharply changed at the time of switching the direct-current voltages, causing electrical noise. In addition, in the electric circuit 90 previously described, electric charges accumulated in the capacitor C flow through the electric resistance R at the time of changing the voltage from $\pm V_0$ to 0, where electric power is consumed.

The matter to be achieved by the present invention is to provide a radio-frequency voltage generator capable of suppressing the occurrence of noise and the consumption of electric power.

Solution to Problem

The present invention, which has been made to solve the above problems, is a radio-frequency voltage generator that generates radio-frequency voltage from direct-current voltage and applies the radio-frequency voltage to a load, the radio-frequency voltage generator including:

a) a first direct-current voltage generation section for generating first direct-current voltage;

b) a second direct-current voltage generation section for generating second direct-current voltage having a value different from that of the first direct-current voltage;

c) a transient alternating voltage generation section for oscillating transient alternating voltage having a cycle shorter than a cycle of the radio-frequency voltage, a maximum value of the transient alternating voltage being one of the first direct-current voltage and the second direct-current voltage, and a minimum value of the transient alternating voltage being the other one, starting with an initial value being the first direct-current voltage or the second direct-current voltage; and d) a voltage switch section for switching voltages applied to the load, during a cycle of the radio-frequency voltage, from the first direct-current voltage, to the transient alternating voltage the initial value of which is the first direct-current voltage, to the second direct-current voltage, to the transient alternating voltage the initial value of which is the second direct-current voltage, in this order, the voltage switch section switching the voltages applied to the load such that a time period of the transient alternating voltage becomes a multiple of a half-integer of the cycle of the transient alternating voltage and shorter than a half cycle of the radio-frequency voltage, the half-integer being equal to or greater than 1.5.

In the radio-frequency voltage generator according to present invention, basically, (pseudo-)radio-frequency voltage is generated by applying the first direct-current voltage and the second direct-current voltage to the load alternately. When the switching of voltage between the first direct-current voltage and the second direct-current voltage is performed, a transient alternating voltage is applied to the load, the transient alternating voltage having a maximum value that is one of the first direct-current voltage and the second direct-current voltage, and a minimum value that is the other one. The transient alternating voltage is caused to oscillate a half-integer times starting with an initial value being the direct-current voltage that is applied to the load immediately before the application of the transient alternating voltage, the half-integer being equal to or greater than 1.5, namely, the transient alternating voltage is caused to oscillate one or more times and further oscillate a half times, whereby the transient alternating voltage can be switched from the first direct-current voltage to the second direct-current voltage or from the second direct-current voltage to the first direct-current voltage before and after the application of the transient alternating voltage. By interposing the transient alternating voltage in such a manner, the direct-current voltages can be gently switched as compared with a conventional radio-frequency voltage generator using a rectangular wave, whereby it is possible to suppress the occurrence of noise. In addition, switching the first direct-current voltage and the second direct-current voltage with the transient alternating voltage interposed therebetween need not an electric resistance that is a cause of the loss of electric power.

The radio-frequency voltage generator according to the present invention can include an effective amplitude change section for changing the ratio of a time period for which the first direct-current voltage and the second direct-current voltage is applied to a time period for which the transient alternating voltage is applied. When a time period to apply the first direct-current voltage and the second direct-current voltage is made long, the effective amplitude of radio-frequency voltage becomes large, and when the time period is made short, the amplitude becomes small. In such a manner, only by changing the above ratio of the time periods, it is possible to easily control the effective amplitude of the radio-frequency voltage. Here, since the period of the transient alternating voltage is a multiple of (n+0.5) (n is a natural number) of the cycle of the transient alternating voltage, the above ratio can be changed by changing the value of n.

The radio-frequency voltage generator according to the present invention can further include a radio-frequency voltage frequency change section f changing one or both of the time period for which the first direct-current voltage and the second direct-current voltage is applied, and the time period for which the transient alternating voltage is applied. With this configuration, the frequency of the radio-frequency voltage can be changed only by changing these time periods.

One such transient alternating voltage generator is suitably used in which the transient alternating voltage generator is an LC circuit including an inductor and a capacitor connected in series to each other, and that further includes an LC circuit make-and-break section for making and breaking the LC circuit, and a direct-current voltage selective application section for selectively applying the first direct-current voltage or the second direct-current voltage to the capacitor. In the transient alternating voltage generator having such a configuration, when the voltage switch section switches from the direct-current voltage being one of the first direct-current voltage and the second direct-current voltage to the transient alternating voltage, the LC circuit make-and-break section breaks the LC circuit, and then the direct-current voltage selective application section applies the one direct-current voltage to the capacitor. Thereafter, the direct-current voltage selective application section ends the application of the one direct-current voltage, and then the LC circuit make-and-break section makes the LC circuit. This causes an alternate-current (AC) voltage having the initial value being the one direct-current voltage, namely the direct-current voltage applied immediately before the application of the transient alternating voltage to generate across the capacitor. Therefore, the voltage across the capacitor may be output as the transient alternating voltage to be applied to the load. Here, if the load constitutes the capacitor, the load itself may be provided as the capacitor of the LC circuit.

The radio-frequency voltage generator according to the present invention can be preferably used to supply radio-frequency voltages to a charged particle controller used in a mass spectrometer. For example, in the ion guide previously described, the radio-frequency voltage generator can be used for supplying the radio-frequency voltage $V_{RF}$ to be applied to the electrodes. In particular, the radio-frequency voltage generator including the effective amplitude change section can be preferably used in that the pseudopotential $V_p(R)$ in the ion guide can be easily controlled by changing the amplitude of the radio-frequency voltage $V_{RF}$. To change the amplitude V along ion beam axis as previously described, separate radio-frequency voltage generators may be used for individual electrodes arranged in the direction of the ion beam axis, and the radio-frequency voltages having different amplitudes may be applied to electrodes from the respective radio-frequency voltage generators.

When the radio-frequency voltage genera or according to the present invention is used to supply radio-frequency voltages to a charged particle controller, the waveform of the transient alternating voltage is contained in the waveform of the intended radio-frequency voltage. However, when the frequency of the transient alternating voltage is made sufficiently high, charged particles are difficult to font temporal changes in force exerted by the transient alternating voltage, and thus the transient alternating voltage will have no influence on the control of the charged particles. In addition, using a radio-frequency filter having a cut-off frequency higher than the frequency Ω of the radio-frequency voltage and lower than the frequency co of the transient alternating voltage, the influence of the transient alternating voltage can be also eliminated.

The radio-frequency voltage generator according to the present invention is also applicable to a device other than the charged particle controller. For example, in a DC-DC converter converting the value of direct-current voltage, with the first direct-current voltage set at the direct-current voltage before the conversion and the second direct-current voltage set at zero, a high-frequency current having a voltage oscillating between the direct-current voltage before the conversion and zero is generated by the radio-frequency voltage generator according to the present invention, and thereafter the high-frequency current is rectified to direct current (DC), whereby a direct-current having a voltage different from that before the conversion is output. Here, by changing the amplitude of the radio-frequency voltage using the radio-frequency voltage generator including the effective amplitude change section, the direct-current voltage on the output side can be controlled.

Advantageous Effects of Invention

According to the radio-frequency voltage generator according to the present invention, by applying the transient alternating voltage during switching between the first direct-current voltage and the second direct-current voltage, the voltage can be gently switched as compared with a conventional radio-frequency voltage generator using a rectangular wave, whereby it is possible to suppress the occurrence of noise. In addition, switching the first direct-current voltage and the second direct-current voltage with the transient alt voltage interposed therebetween need not an electric resistance that is a cause of the loss of electric power.

BRIEF DESCRIPTION OF DRAWINGS

FIG. 8A is a cross section parallel to the ion beam axis, and FIG. 8B is a cross section orthogonal to the ion beam axis.

DESCRIPTION OF EMBODIMENTS

An embodiment of a radio-frequency voltage generator according to the present invention will be described with reference to FIG. 1 to FIG. 8A and FIG. 8B.

Embodiment

Figure 1:
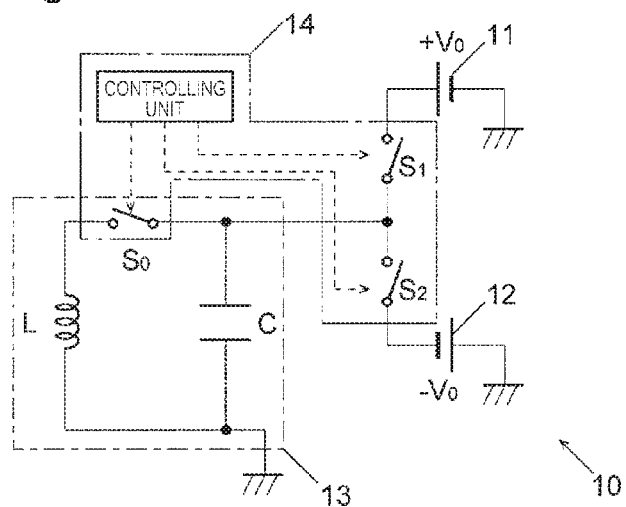
FIG. 1 is a diagram illustrating an electric circuit in an example of a radio-frequency voltage generator according to the present invention.

A radio-frequency voltage generator 10 according to the present embodiment includes an electric circuit illustrated in FIG. 1. The radio-frequency voltage generator 10 is configured to supply radio-frequency voltage to an ion guide used in a mass spectrometer, and a capacitor C of the electric circuit is equivalent to an electrode pair in the ion guide.

The radio-frequency voltage generator 10 includes a first direct-current (DC) power supply 11, a second direct-current (DC) power supply 12, a transient alternating voltage generation circuit 13, and a voltage switch section 14. The first DC power supply 11 corresponds to the first direct-current voltage generation section, the second DC power supply 12 corresponds to the second direct-current voltage generation section, and the transient alternating voltage generation circuit 13 corresponds to the transient alternating voltage generation section.

One of the terminals of the capacitor C (electrode pair) is grounded, and the other terminal is connected in parallel to a first DC power supply 11 at a potential $+V_0$ via a first switch $S_1$ and a second DC power supply 12 at a potential $-V_0$ via a second switch $S_2$.

To the two terminals of the capacitor C (electrode pair), a coil L and a zeroth switch $S_0$, which are connected in series to each other, are connected in parallel to the capacitor C (electrode pair). These form an LC circuit including the coil L and the capacitor C (electrode pair). In the present embodiment, the LC circuit will be referred to as the transient alternating voltage generation circuit 13. Hereafter, the resonance frequency of the transient alternating voltage generation circuit 13 will be denoted by ω for distinction from a frequency Ω of the radio-frequency voltage generated by the radio-frequency voltage generator 10. The inductance of the coil L is set so that the resonance frequency ω of the transient alternating voltage generation circuit 13 becomes sufficiently higher than the frequency Ω of the radio-frequency voltage (e.g. ten or more times). The voltage swath section 14 includes the zeroth switch $S_0$, the first switch $S_1$ and the second switch $S_2$, as well as a controlling unit 141 configured to perform control of opening/closing these three switches.

The operation of the radio-frequency voltage generator 10 according to the present embodiment will be described with reference to FIG. 2 to FIG. 5.

First, before the radio-frequency voltage is applied to the capacitor C (electrode pair), a positive direct-current voltage $+V_0$ is applied in the following manner. With all of the zeroth switch $S_0$, the first switch $S_1$, and the second switch $S_2$ broken, the controlling unit 141 transmits a predetermined control signal to the first switch $S_1$ to close the first switch $S_1$ (FIG. 2(1)). This operation causes the voltage of the capacitor C (electrode pair) to rise to $+V_0$ (the period illustrated in FIG. 4 by reference numeral (1), which will be hereafter simply referred to as FIG. 4(1) or the like). Bold broken lines in FIG. 2 and FIG. 3 each represent that a control signal to open or close a switch (zeroth switch $S_0$, first switch $S_1$, second switch $S_2$) is transmitted from the controlling unit 141. Hereafter, description will not be made about the transmission of control signals by the controlling unit 141 but made only about the operation of opening or closing the switches.

Figure 2:
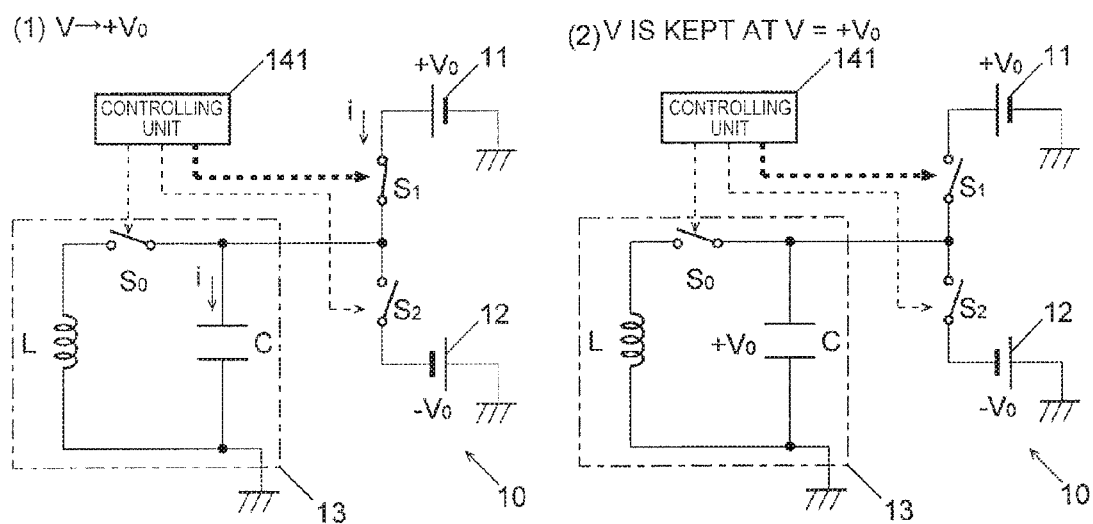
FIG. 2 is a diagram illustrating the operation of setting an initial state in the radio-frequency voltage generator according to the present embodiment.
Figure 4:
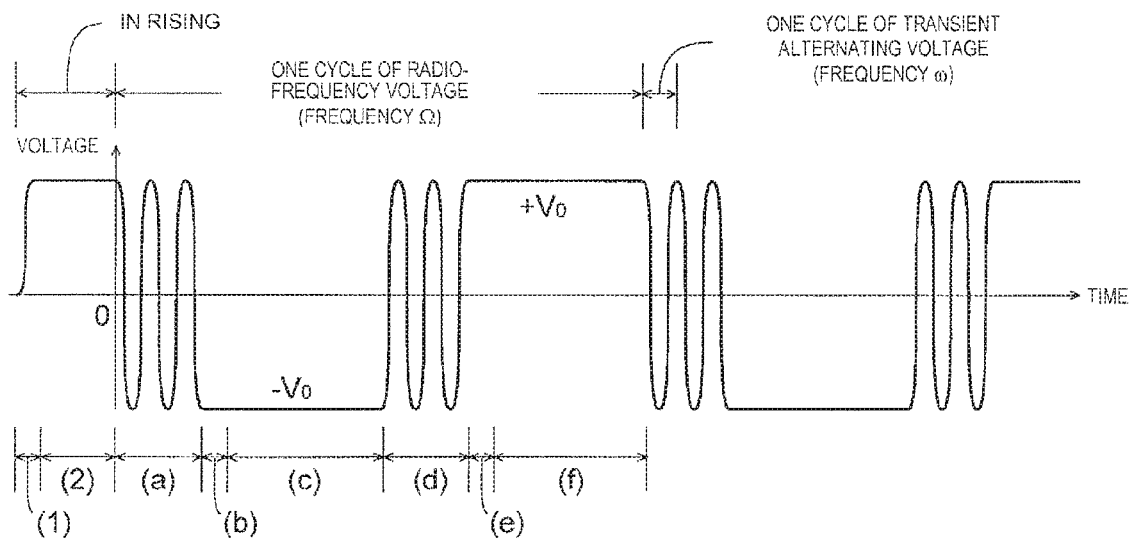
FIG. 4 is a graph illustrating a waveform of the radio-frequency voltage generated by the radio-frequency voltage generator according to the present embodiment.

Thereafter, the first switch $S_1$ is opened (FIG. 2(2)), which retains an initial state where the positive direct-current voltage $+V_0$ is applied to the capacitor C (electrode pair) (FIG. 4(2)).

From this state, the application of the radio-frequency voltage is started.

Figure 3:
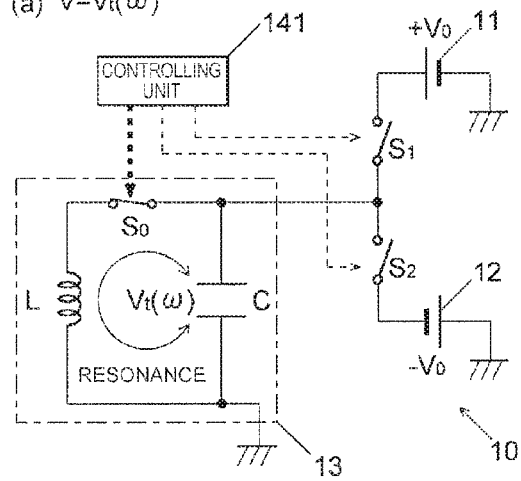
FIG. 3 is a diagram illustrating the operation of applying radio-frequency voltage to a load (capacitor) in the radio-frequency voltage generator according to the present embodiment.
Figure 3:
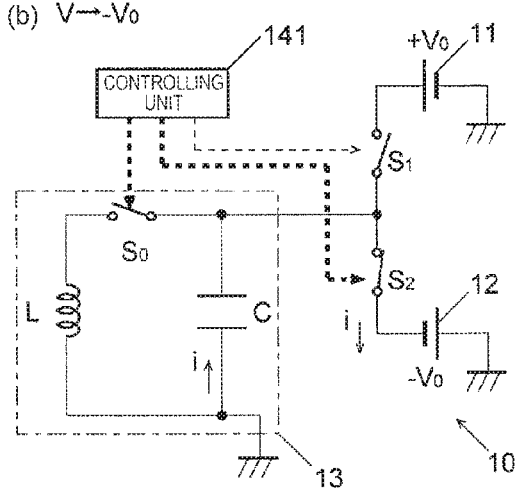
Figure 3:
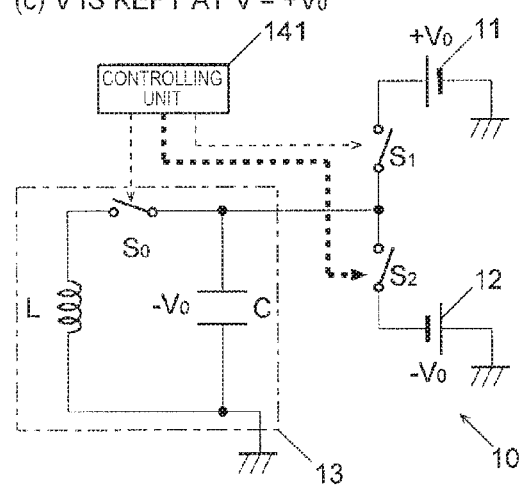
Figure 3:
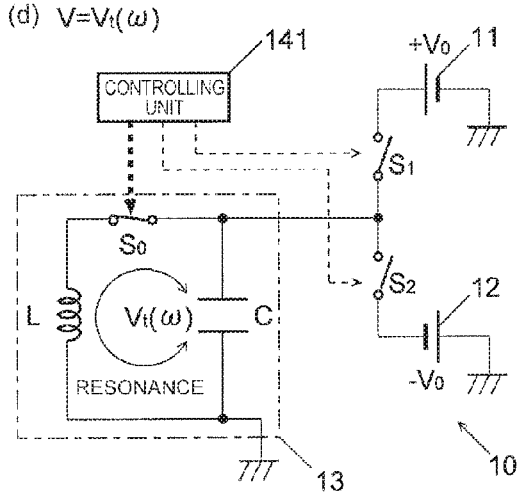
Figure 3:
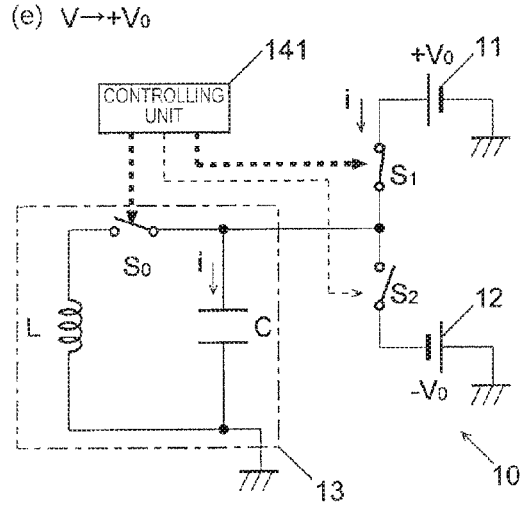
Figure 3:
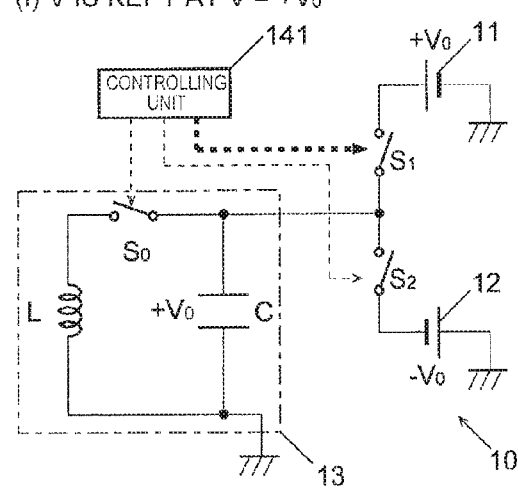

First, the zeroth switch $S_0$ is closed (FIG. 3(*a*)), This causes resonance current to flow through the LC circuit, and a transient alternating voltage is applied to the capacitor C (electrode pair), the transient alternating voltage having an initial value of $+V_0$, maximum value of $+V_0$, a minimum value of $-V_0$, and a frequency of ω (FIG. 4(*a*)). This transient alternating voltage is applied for a time period during which the transient alternating voltage oscillates a half-integer of times (1.5 or more times), namely the transient alternating voltage oscillates one or more times and further oscillates a half times (hereafter, referred to as a transient alternating voltage application time period). The time period may be controlled based on the clock frequency of a CPU included in the controlling unit 141 after calculating the frequency ω in advance. Alternatively, a frequency counter for detecting the oscillation of the voltage may be provided in the LC circuit, and the timing to end the application of the transient alternating voltage may be determined based on the number of counts.

Figure 5:
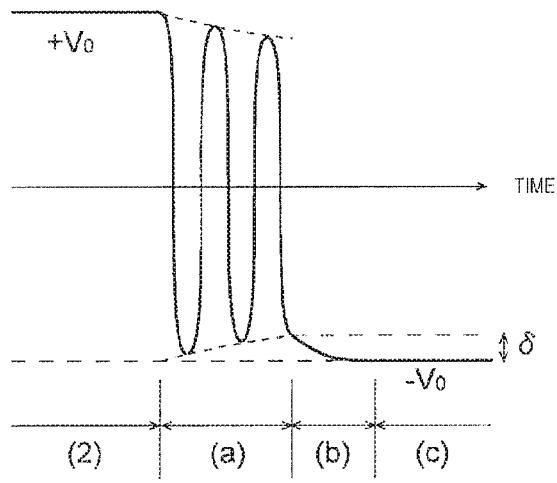
FIG. 5 is a partially enlarged view of the waveform of the radio-frequency voltage.

By the transient alternating voltage oscillating a half-integer of times (1.5 or more times when the transient alternating voltage application time period has elapsed, the voltage applied to the capacitor C (electrode pair) theoretically becomes a voltage $-V_0$, namely the reverse of a voltage $+V_0$ that is a voltage immediately before the application of the transient alternating voltage. However, the LC circuit has an internal resistance, and thus, as illustrated in FIG. 5, the voltage applied to the capacitor C (electrode pair) actually attenuates to $-(V_0-\delta)$ the absolute value of which is slightly smaller than that of $-V_0$. In FIG. 5, the attenuation is enhanced than actual for convenience of illustration. Thus, when the transient alternating voltage application time period has elapsed, the zeroth switch $S_0$ is opened, and the second switch $S_2$ is closed (FIG. 3(*b*)). This increases the absolute value of the direct-current voltage applied to the capacitor C (electrode pair), whereby the direct-current voltage becomes $-V_0$ ((b) in FIG. 4 and FIG. 5).

Next, the second switch $S_2$ is opened (FIG. 3(*c*)), and this state is retained for a predetermined time period (hereafter, referred to as a direct-current voltage retention time period) (FIG. 4(*c*)). Here, the predetermined time period is set so that the total of the predetermined time period, the transient alternating voltage application time period (FIG. 4(*a*)), and a time period to apply a negative direct-current voltage $-V_0$ (FIG. 4(*b*)) becomes a half cycle of the radio-frequency voltage. The direct-current voltage retention time period is controlled based on the clock frequency of the CPU of the controlling unit 141.

After the lapse of the direct-current voltage retention time period, the zeroth switch $S_0$ is closed (FIG. 3(*d*)), whereby the resonance current flows through the LC circuit again, and a transient alternating voltage is applied to the e capacitor C (electrode pair), the transient alternating voltage having an initial value of $-V_0$, a minimum value of $-V_0$, a maximum value of $+V_0$, and a frequency of ω (FIG. 4(*d*)). Then, by applying this transient alternating voltage for the transient alternating voltage application time period, the voltage applied to the capacitor C (electrode pair) is reversed from $-V_0$ to $-V_0$ (strictly, $+V_0-\delta$)).

Thereafter, the zeroth switch $S_0$ is opened and the first switch $S_1$ is closed (FIG. 3(*e*)), whereby the direct-current voltage applied to the capacitor C (electrode pair) is adjusted to $+V_0$ (FIG. 4(*e*)). Then, the first switch $S_1$ is opened (FIG. 3(*f*)), and this state is retained for the direct-current voltage retention time period (FIG. 4(*f*)).

By the operation so far, the radio-frequency voltage is applied to the capacitor C (electrode pair) by one cycle. Afterward, the above operation is repeated and the radio-frequency voltage is continuously applied to the capacitor C (electrode pair).

According to the radio-frequency voltage generator 10 according to the present embodiment, by applying the transient alternating voltage to the capacitor C (electrode pair) at the time of switching from the positive direct-current voltage $+V_0$ to the negative direct-current voltage $-V_0$, and at the time of switching from the negative direct-current voltage $-V_0$ to the positive direct-current voltage $+V_0$, the voltage can be gently switched as compared with a conventional radio-frequency voltage generator using a rectangular wave, whereby it is possible to suppress the occurrence of noise and the loss of electric power.

Figure 6A:
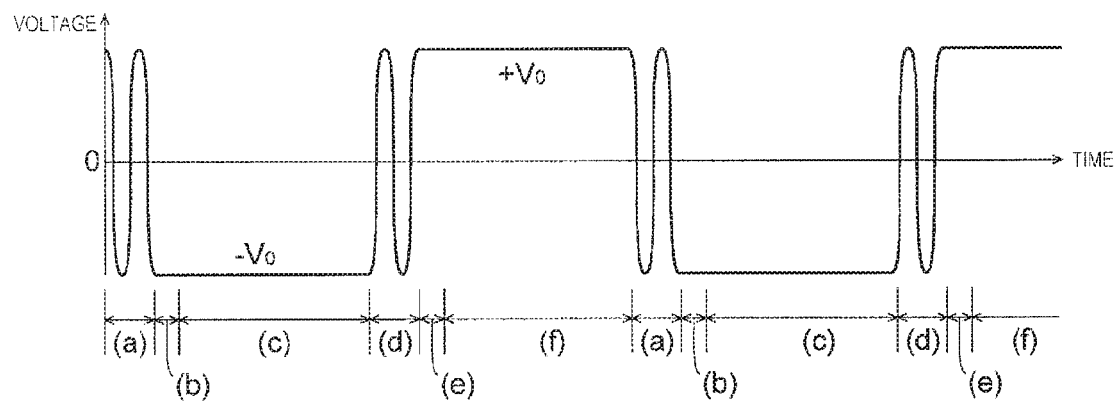
FIG. 6A, FIG. 6B, and FIG. 6C are graphs illustrating how to control the effective magnitude of the radio-frequency voltage applied to a capacitor C in the radio-frequency voltage generator according to the present embodiment.
Figure 6B:
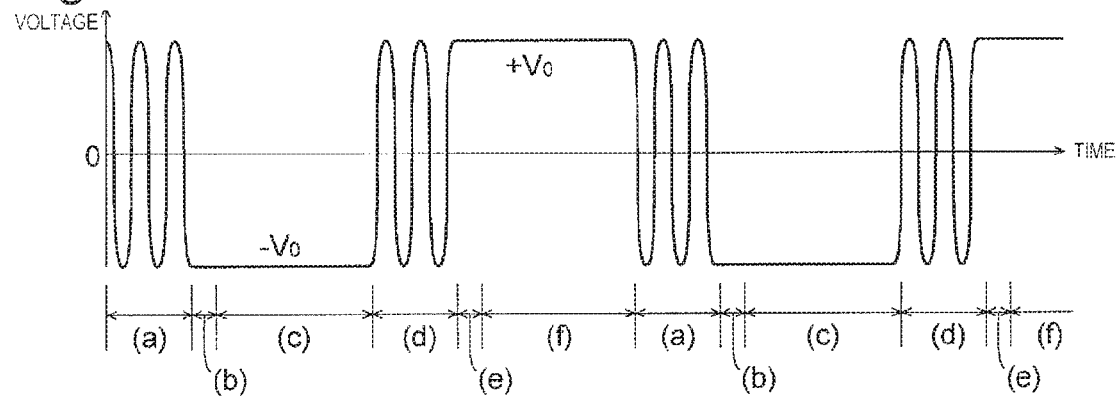
Figure 6C:
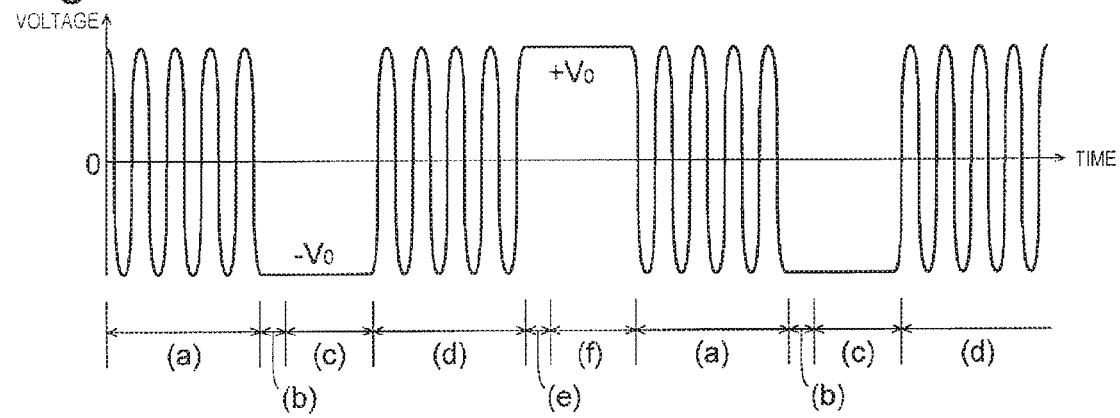

In the radio-frequency voltage generator 10 according to the present embodiment, as illustrated in FIG. 6A, FIG. 6B, and FIG. 6C, by changing the ratio of the direct-current voltage retention time period to the transient alternating voltage application time period, it is possible to control the effective magnitude of the radio-frequency voltage applied to the capacitor C (electrode pair). In the example illustrated in FIG. 6A, FIG. 6B, and FIG. 6C, the ratio of the direct-current voltage retention time period ((c), (f)) to the transient alternating voltage application time period ((a), (d)) becomes small in the order of FIG. 6A, FIG. 6B, and FIG.

6C, the effective magnitude of the radio-frequency voltage also becomes small in this order.

Figure 7A:
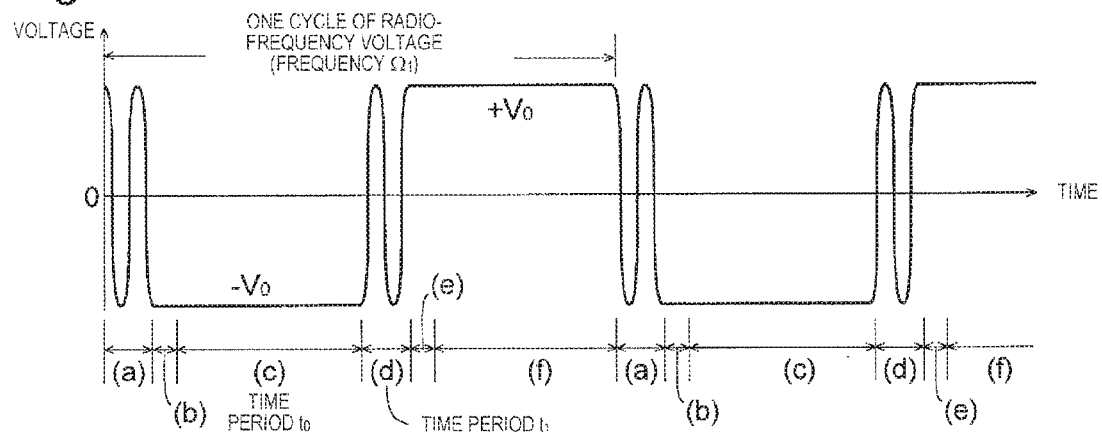
FIG. 7A, FIG. 7B, and FIG. 7C are graphs illustrating how to control the frequency of the radio-frequency voltage applied to the capacitor C in the radio-frequency voltage generator according to the present embodiment.
Figure 7B:
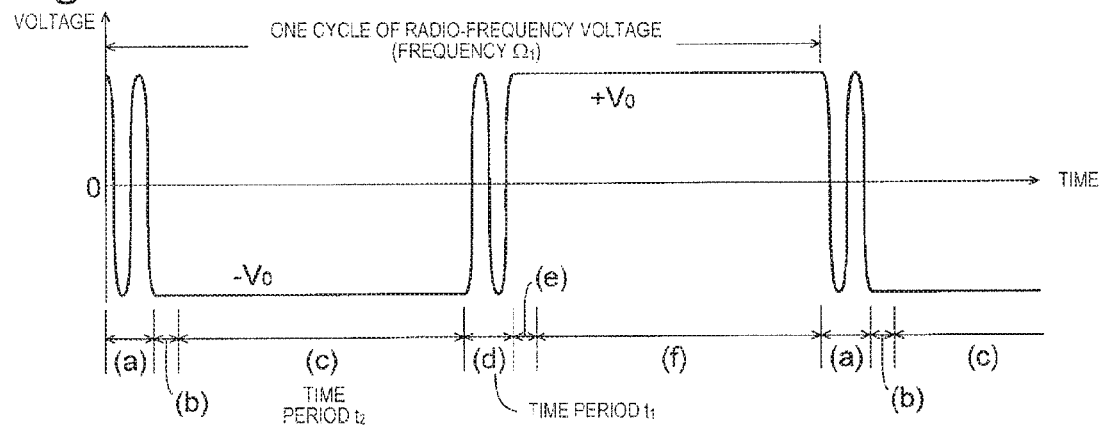
Figure 7C:
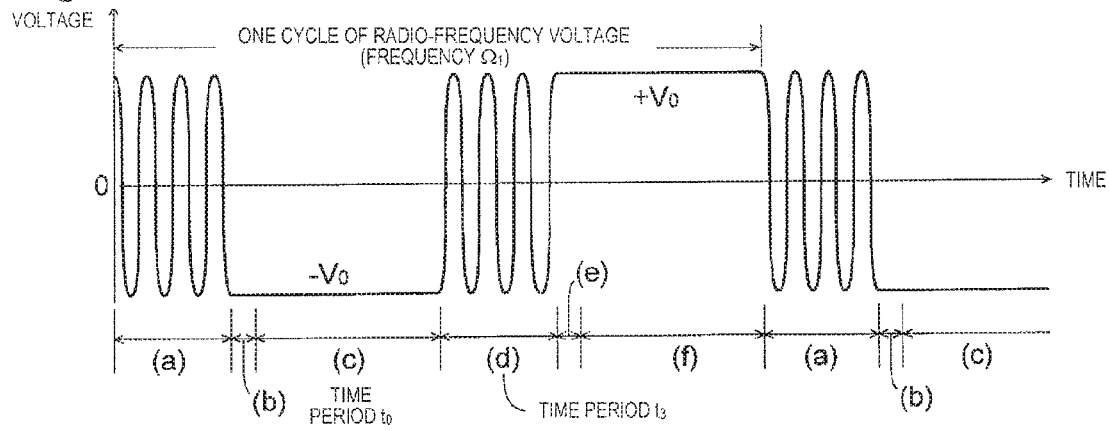

In addition, in the radio-frequency voltage generator 10 according to the present embodiment, as illustrated in FIG. 7A, FIG. 7B, and FIG. 7C, by changing the direct-current voltage retention time period and/or the transient alternating voltage application time period, it is possible to control the frequency of the radio-frequency voltage applied to the capacitor C (electrode pair). Comparing FIG. 7A with FIG. 7B, the transient alternating voltage application time period is the same, but the latter has a direct-current voltage retention time period longer than that of the former, and accordingly, the latter has a frequency of the radio-frequency voltage lower than that of the former. In addition, comparing FIG. 7A with FIG. 7C, the direct-current voltage retention time period is the same, but the latter has a transient alternating voltage application time period longer than that of the former, and accordingly, the latter has a frequency of the radio-frequency voltage lower than that of the former. As seen from the relation between the FIG. 7B and FIG. 7C, both of the direct-current voltage retention time period and the transient alternating voltage application time period may be changed.

Figure 8A:
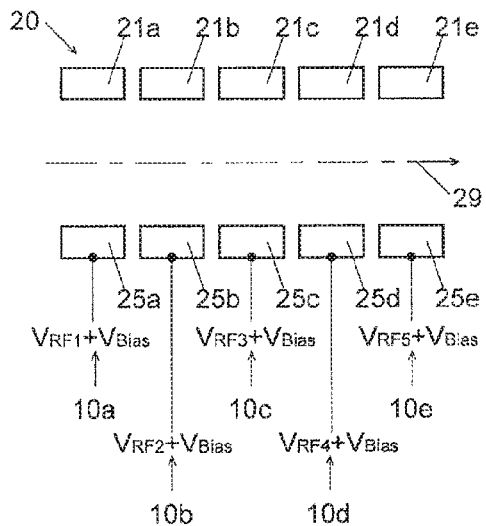
FIG. 8A and FIG. 8B are diagrams illustrating an example of an ion guide in which the radio-frequency voltage generator according to the present embodiment is used as a power supply, where
Figure 8B:
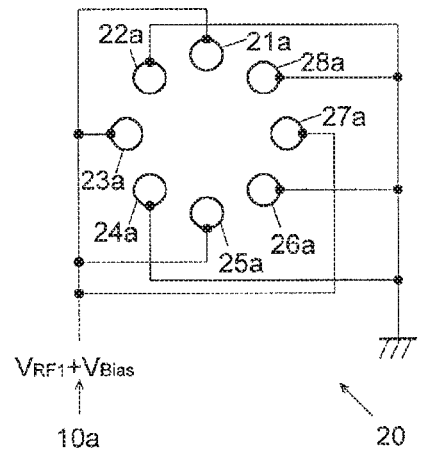
Figure 9A:
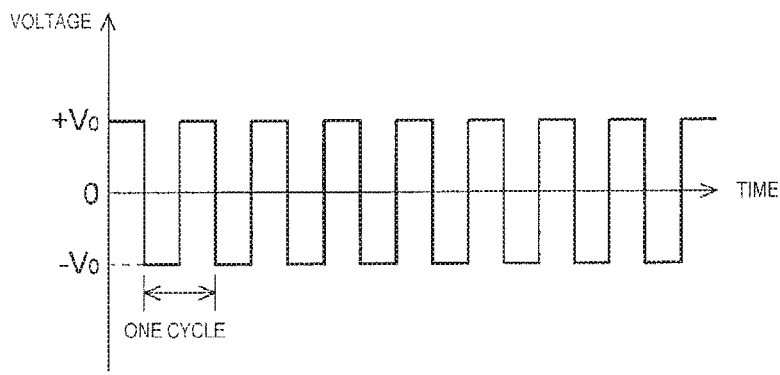
FIG. 9A and FIG. 9B are graphs illustrating the waveform of voltage generated by a conventional radio-frequency voltage generator.
Figure 9B:
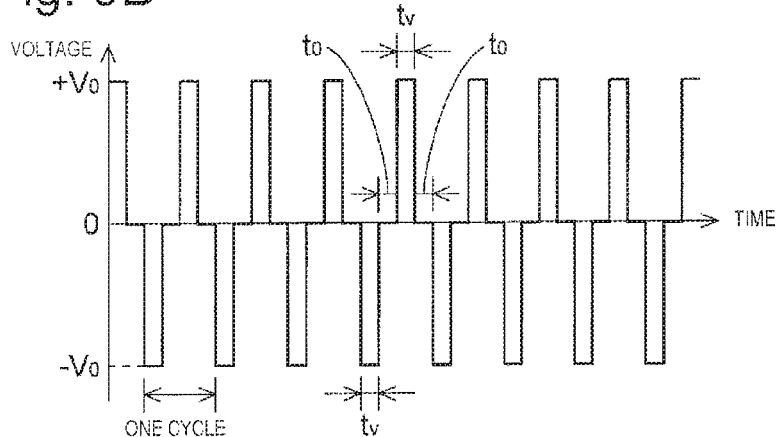
Figure 10:
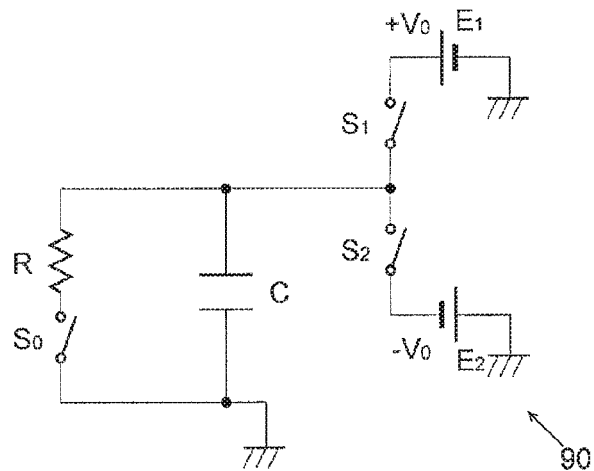
FIG. 10 is an example of an electric circuit in the conventional radio-frequency voltage generator.
Figure 11A:
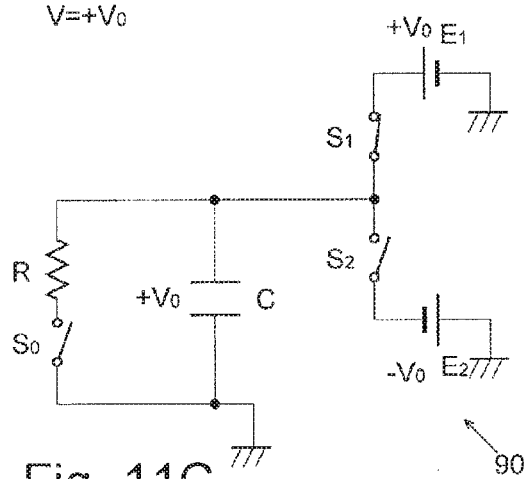
FIG. 11A, FIG. 11B, FIG. 11C, and FIG. 11D are illustrative diagrams illustrating the operation of the electric circuit in the conventional radio-frequency voltage generator.
Figure 11B:
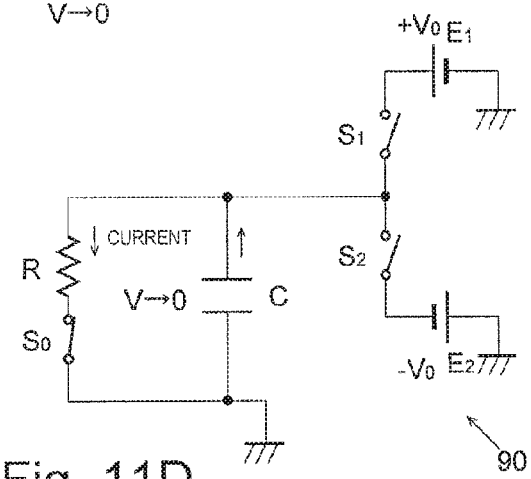
Figure 11C:
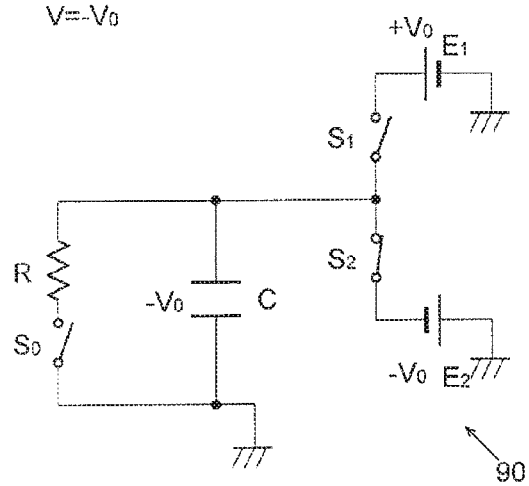
Figure 11D:
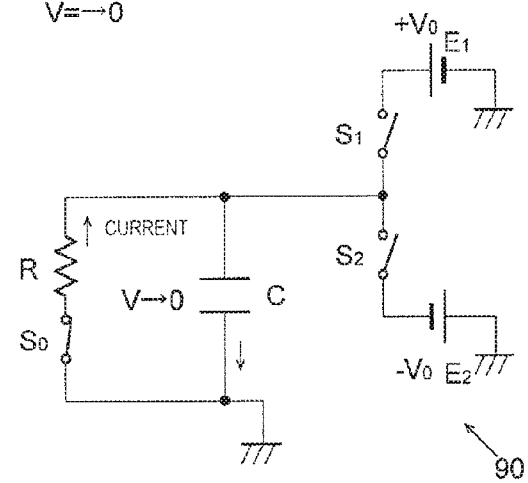

With reference to FIG. 8A and FIG. 8B, an example of an ion guide including the radio-frequency voltage generator 10 according to the present embodiment will be described. In an ion guide 20, eight sets of electrodes are arranged around ion beam axis 29 at regular intervals, where a set of electrodes include rods separately arranged in the direction of an ion beam axis 29 at regular intervals. Five electrodes arranged in the direction of the ion beam axis 29 are denoted by reference signs 2x*a*, 2x*b*, 2x*c*, 2x*d*, and 2x*e*. Here, x denotes a number from 1 to 8 attached correspondingly to the eight sets of electrodes arranged around the ion beam axis 29 in the arrangement order. The radio-frequency voltage generator 10 according to the present embodiment is provided for each eight electrodes lying in the some position in the direction of ion beam axis 29.

For electrodes 2x*a* that are the most upstream on the ion beam axis 29, a radio-frequency voltage $V_{RF1}$ is applied between electrodes each having x being an odd number and electrodes each having x being an even number, using a radio-frequency voltage generator 10*a*. Similarly, for electrodes 2x*b*, 2x*c*, 2x*d*, and 2x*e* that are the second to fifth upstream on the ion beam axis 29, radio-frequency voltages $V_{RF2}$, $V_{RF3}$, $V_{RF4}$, $V_{RF5}$ are applied between electrodes each having x being an odd number and electrodes each having x being an even number. In addition, besides these radio-frequency voltages, a DC bias voltage $V_{Bias}$, is applied while superimposed on the radio-frequency voltages.

In this ion guide 20, by making the amplitudes of the radio-frequency voltages in the order of $|V_{RF1}|>|V_{RF2}|>|V_{RF3}|>|V_{RF4}|>|V_{RF5}|$ through the adjusting of the ratios of the direct-current voltage retention time period and the transient alternating voltage application time period in each of radio-frequency voltage generators 10*a* to 10*e*, a gradient having a pseudopotential that becomes small toward the direction of the ion beam axis is formed in the ion guide 20. In addition, by increasing the frequency Ω of the radio-frequency voltage through the adjustment of the value of the direct-current voltage retention time period and/or the transient alternating voltage application time period in each of the radio-frequency voltage generators 10*a* to 10*e*, a similar pseudopotential is formed in the ion guide 20. Owing to the formation of the pseudopotential in such a manner, the ion guide 20 moves positive ions toward the direction of the ion beam axis.

The description has been made so far about an example of using the radio-frequency voltage generator 10 as the power supplies in the ion guide. The radio-frequency voltage generator 10 is also applicable to a charged particle controller other than an ion guide in a mass spectrometer, such as an ion trap and a mass filter. In addition, the radio-frequency voltage generator 10 is also applicable to a device other than a charged particle controller, such as a device that generates radio-frequency voltage from direct-current voltage in the process of voltage conversion in a DC-DC converter.

REFERENCE SIGNS LIST

10, 10*a* to 10*e* . . . Radio-Frequency Voltage Generator
11 . . . First DC Power Supply
12 . . . Second DC Power Supply
13 . . . Transient Alternating Voltage Generation Circuit
14 . . . Voltage Switch Section
141 . . . Controlling Unit
20 . . . Ion Guide
21*a* to 28*a*, 21*b* to 28*b*, 21*c* to 28*c*, 21*d* to 28*d*, 21*e* to 28*e*
    . . . Electrode of Ion Guide
29 . . . Ion Beam Axis
90 . . . Electric Circuit in Conventional Radio-Frequency Voltage Generator

The invention claimed is:

1. A radio-frequency voltage generator that generates radio-frequency voltage from direct-current voltage and applies the radio-frequency voltage to a load, the radio-frequency voltage generator comprising:
   a) a first direct-current voltage generation section for generating first direct-current voltage;
   b) a second direct-current voltage generation section for generating second direct-current voltage having a value different from that of the first direct-current voltage;
   c) a transient alternating voltage generation section for oscillating transient alternating voltage having a cycle shorter than a cycle of the radio-frequency voltage, a maximum value of the transient alternating voltage being one of the first direct-current voltage and the second direct-current voltage, and a minimum value of the transient alternating voltage being the other one, starting with an initial value being the first direct-current voltage or the second direct-current voltage; and
   d) a voltage switch section for switching voltages applied to the load, during a cycle of the radio-frequency voltage, from the first direct-current voltage, to the transient alternating voltage the initial value of which is the first direct-current voltage, to the second direct-current voltage, to the transient alternating voltage the initial value of which is the second direct-current voltage, in this order, the voltage switch section switching the voltages applied to the load such that a time period of the transient alternating voltage becomes a multiple of a half-integer of the cycle of the transient alternating voltage and shorter than a half cycle of the radio-frequency voltage, the half-integer being equal to or greater than 1.5.

2. The radio-frequency voltage generator according to claim 1, further comprising an effective amplitude change section for changing the ratio of a time period for which the first direct-current voltage and the second direct-current voltage is applied to a time period for which the transient alternating voltage is applied.

3. The radio-frequency voltage generator according to claim 1, further comprising a radio-frequency voltage frequency change section for changing one or both of the time period for which the first direct-current voltage and the second direct-current voltage is applied, and the time period for which the transient alternating voltage is applied.

4. The radio-frequency voltage generator according to claim 1, wherein the transient alternating voltage generation section is an LC circuit including an inductor and a capacitor connected in series to each other, and further comprising an LC circuit make-and-break section for making and breaking the LC circuit, and a direct-current voltage selective application section for selectively applying the first direct-current voltage or the second direct-current voltage to the capacitor.

5. The radio-frequency voltage generator according to claim 4, wherein the capacitor is a load of an ion guide or an ion trap.

6. The radio-frequency voltage generator according to claim 2, further comprising a radio-frequency voltage frequency change section for changing one or both of the time period for which the first direct-current voltage and the second direct-current voltage is applied, and the time period for which the transient alternating voltage is applied.

7. The radio-frequency voltage generator according to claim 2, wherein the transient alternating voltage generation section is an LC circuit including an inductor and a capacitor connected in series to each other, and further comprising an LC circuit make-and-break section for making and breaking the LC circuit, and a direct-current voltage selective application section for selectively applying the first direct-current voltage or the second direct-current voltage to the capacitor.

8. The radio-frequency voltage generator according to claim 3, wherein the transient alternating voltage generation section is an LC circuit including an inductor and a capacitor connected in series to each other, and further comprising an LC circuit make-and-break section for making and breaking the LC circuit, and a direct-current voltage selective application section for selectively applying the first direct-current voltage or the second direct-current voltage to the capacitor.

9. The radio-frequency voltage generator according to claim 6, wherein the transient alternating voltage generation section is an LC circuit including an inductor and a capacitor connected in series to each other, and further comprising an LC circuit make-and-break section for making and breaking the LC circuit, and a direct-current voltage selective application section for selectively applying the first direct-current voltage or the second direct-current voltage to the capacitor.

10. The radio-frequency voltage generator according to claim 7, wherein the capacitor is a load of an ion guide or an ion trap.

11. The radio-frequency voltage generator according to claim 8, wherein the capacitor is a load of an ion guide or an ion trap.

12. The radio-frequency voltage generator according to claim 9, wherein the capacitor is a load of an ion guide or an ion trap.

* * * * *